United States Patent
Mariotti et al.

(10) Patent No.: US 9,369,604 B2
(45) Date of Patent: Jun. 14, 2016

(54) MECHANISM FOR SPECULATIVE PRINTING

(75) Inventors: Andrea Mariotti, San Carlos, CA (US); Gregory J. Wolff, Palo Alto, CA (US)

(73) Assignee: RICOH CO., LTD., Tokyo (JP)

(*) Notice: Subject to any disclaimer, the term of this patent is extended or adjusted under 35 U.S.C. 154(b) by 2006 days.

(21) Appl. No.: 11/692,768

(22) Filed: Mar. 28, 2007

(65) Prior Publication Data

US 2008/0239328 A1 Oct. 2, 2008

(51) Int. Cl.
*H04N 1/32* (2006.01)

(52) U.S. Cl.
CPC ..................................... *H04N 1/32* (2013.01)

(58) Field of Classification Search
USPC ................................................. 358/1.1, 1.16
See application file for complete search history.

(56) References Cited

U.S. PATENT DOCUMENTS

| | | | | |
|---|---|---|---|---|
| 6,025,200 | A * | 2/2000 | Kaish ................... | G01N 21/643 422/83 |
| 7,180,622 | B2 * | 2/2007 | Cooper .................. | G06K 17/00 358/1.15 |
| 7,263,524 | B2 * | 8/2007 | Wiley ............... | G06F 17/30569 707/770 |
| 7,570,382 | B2 * | 8/2009 | Savov ............... | G06F 17/30011 358/1.15 |
| 7,573,604 | B2 * | 8/2009 | Hull .................. | G06F 17/30017 235/462.01 |
| 7,675,644 | B2 * | 3/2010 | Bukowski ............... | H04L 29/06 358/1.13 |
| 7,697,155 | B2 * | 4/2010 | Ikegami ............ | G06F 17/30011 235/385 |
| 7,734,093 | B2 | 6/2010 | Wolff et al. | |
| 7,787,141 | B2 * | 8/2010 | Savov ............... | G06F 17/30011 358/1.15 |
| 7,880,909 | B2 * | 2/2011 | Bukowski ............... | H04L 29/06 358/1.1 |
| 2002/0116293 | A1 * | 8/2002 | Lao ...................... | G06F 17/3089 705/27.1 |
| 2002/0152215 | A1 * | 10/2002 | Clark ...................... | G06F 21/10 |
| 2003/0059758 | A1 * | 3/2003 | Cohen ...................... | G09B 5/02 434/317 |
| 2003/0086098 | A1 | 5/2003 | Sesek et al. | |
| 2003/0229857 | A1 | 12/2003 | Sayuda et al. | |
| 2004/0003240 | A1 * | 1/2004 | Lai .......................... | G06F 21/10 713/165 |
| 2004/0078337 | A1 * | 4/2004 | King ...................... | G06F 21/64 705/51 |
| 2004/0100363 | A1 * | 5/2004 | Lane .................... | G06K 19/025 340/5.86 |

(Continued)

FOREIGN PATENT DOCUMENTS

| | | | |
|---|---|---|---|
| EP | 1 691 543 A | | 8/2006 |
| EP | 1691543 A1 * | | 8/2006 |

(Continued)

OTHER PUBLICATIONS

European Search Report dated Dec. 3, 2008 for EP 08 25 993, 5 pages.

(Continued)

*Primary Examiner* — Hilina K Demeter
(74) *Attorney, Agent, or Firm* — Blakely, Sokoloff, Taylor & Zafman LLP (57) ABSTRACT

A method is disclosed. The method includes receiving a request regarding a first document, retrieving a second document from a cache, the second document having a pre-existing relationship with the first document, extracting data from the second document image data, applying image processing to the first document using the extracted data from the second document image data to create a third document and printing the third document.

12 Claims, 7 Drawing Sheets

(56) References Cited

U.S. PATENT DOCUMENTS

| | | | |
|---|---|---|---|
| 2004/0233040 A1* | 11/2004 | Lane | G06K 19/025 340/5.86 |
| 2005/0002053 A1* | 1/2005 | Meador | H04N 1/4446 358/1.14 |
| 2005/0069364 A1 | 3/2005 | Mokuya et al. | |
| 2005/0172240 A1* | 8/2005 | Tran | G06F 17/30011 715/764 |
| 2006/0103872 A1 | 5/2006 | Shimogori | |
| 2006/0184522 A1 | 8/2006 | McFarland et al. | |
| 2007/0030528 A1* | 2/2007 | Quaeler | G06F 17/30634 358/453 |
| 2008/0077465 A1* | 3/2008 | Schimpf | G06Q 10/06 705/7.26 |
| 2008/0144076 A1 | 6/2008 | Boliek et al. | |

FOREIGN PATENT DOCUMENTS

| | | |
|---|---|---|
| JP | 2005-271581 | 10/2005 |
| WO | WO 03/071850 A | 9/2003 |

OTHER PUBLICATIONS

Adobe PostScript, Open Prepress Interface (OPI) Specification—Version 2.0, Technical Note #5660, Jan. 19, 2000, San Jose, CA, 30 pages.

* cited by examiner

EXAMPLE OF A WORKFLOW WITH MFP 100

MECHANISM FOR SPECULATIVE PRINTING

FIELD OF THE INVENTION

The present invention relates to document printers and scanners; more particularly, the present invention relates to speculatively printing documents.

BACKGROUND

The use and proliferation of paper copiers is well known. Since their introduction, photocopiers have become an essential and basic part of every office and organization. Recently, the functionality of printers and photocopiers has converged into a new device referred to as a Multi-Function Printer (MFP). Such multi-function printers have become commonplace and typically include the ability to scan documents, print documents, photocopy documents, and send and receive facsimile transmissions.

However, various studies have shown that the time lapse between a print request and the time a physical document is available for retrieval at a device affects consumer confidence in the device in terms of whether it makes their job easier or harder. Print performance also impacts office efficiency, where workflow is adversely affected by long printing times.

Particularly, adverse effects may be observed where printing times are in the range of minutes per document with documents of less than five pages. The adverse effects result in a cumbersome work experience for the users as they multitask in an attempt to make up for the long printing time. Such multitasking may actually introduce more confusion and delays into the workflow.

SUMMARY OF THE INVENTION

A method and apparatus for speculation printing are disclosed. According to one embodiment, a method includes receiving a request regarding a first document, retrieving a second document from a cache, the second document having a pre-existing relationship with the first document, extracting data from the first document, applying image processing to the second document using the extracted data from the first document image data to create a third document, and printing the third document.

In a further embodiment, an additional method includes scanning a document, determining if the document is a part of a workflow, and storing a second document in a printer cache if the document is a part of a workflow, the second document having image data of the first document applied to its image data. In one embodiment, the ID comprises a document type, a user who acted on the document and a unique instance number.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

A mechanism for speculative printing is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system or network. For example, the invention can operate on a stand alone multifunction printer or a networked printer with functionality varying depending on the configuration. Thus, the present invention is capable of operating with any information system from those with minimal functionality to those providing all the functionality disclosed herein.

Multi-Function Printer

Figure 1:
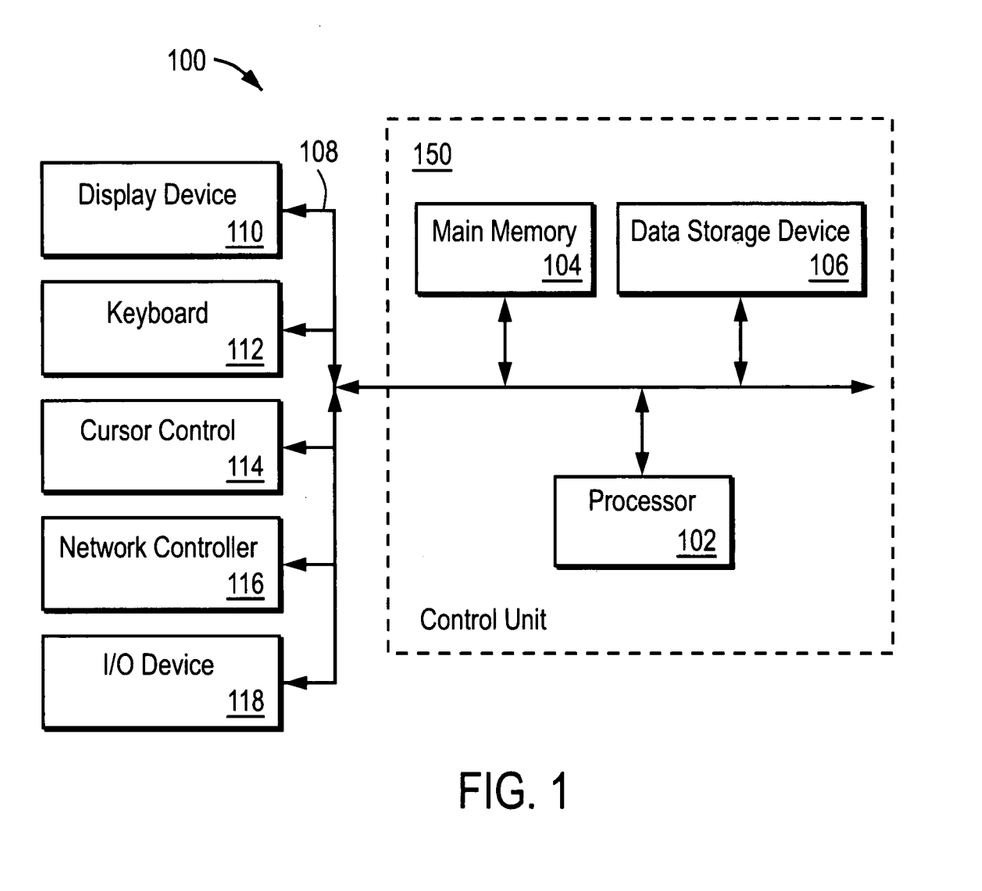
FIG. 1 illustrates one embodiment of a multi-function printer.

FIG. 1 is a block diagram of one embodiment of a multi-function printer (MFP) 100. The multi-function printer 100 includes a control unit 150, a display device 110, a keyboard 112, a cursor control device 114, a network controller 116 and one or more input/output (I/O) device(s) 118.

Control unit 150 may include an arithmetic logic unit, a microprocessor, a general purpose computer, a personal digital assistant or some other information appliance equipped to provide electronic display signals to display device 110. In one embodiment, control unit 150 includes a general purpose computer having a graphical user interface, which may be generated by, for example, a program written in Java running on top of an operating system like WINDOWS® or UNIX® based operating systems. In a further embodiment, one or more application programs are executed by control unit 150 including, without limitation, word processing applications, electronic mail applications, financial applications, and web browser applications.

Still referring to FIG. 1, control unit 150 is shown including processor 102, main memory 104, and data storage device 106, all of which are communicatively coupled to system bus 108. Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included.

Main memory 104 stores instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art.

Data storage device 106 stores data and instructions for processor 102 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 108 represents a shared bus for communicating information and data throughout control unit 150. System bus 108 may represent one or more buses including an industry standard architecture (ISA) bus, a peripheral component interconnect (PCI) bus, a universal serial bus (USB), or some other bus known in the art to provide similar functionality. Additional components coupled to control unit 150 through system bus 108 include the display device 110, the keyboard 112, the cursor control device 114, the network controller 116 and the I/O device(s) 118.

Display device 110 represents any device equipped to display electronic images and data as described herein. Display device 110 may be, for example, a cathode ray tube (CRT), liquid crystal display (LCD), or any other similarly equipped display device, screen, or monitor. In one embodiment, display device 110 is equipped with a touch screen in which a touch-sensitive, transparent panel covers the screen of display device 110.

Keyboard 112 represents an alphanumeric input device coupled to control unit 150 to communicate information and command selections to processor 102. Keyboard 112 can be a QWERTY keyboard, a key pad, or representations of such created on a touch screen.

Cursor control 114 represents a user input device equipped to communicate positional data as well as command selections to processor 102. Cursor control 114 may include a mouse, a trackball, a stylus, a pen, a touch screen, cursor direction keys, or other mechanisms to cause movement of a cursor.

Network controller 116 links control unit 150 to a network that may include multiple processing systems. The network of processing systems may comprise a local area network (LAN), a wide area network (WAN) (e.g., the Internet), and/or any other interconnected data path across which multiple devices may communicate. The control unit 150 also has other conventional connections to other systems such as a network for distribution of files (media objects) using standard network protocols such as TCP/IP, http, https, and SMTP as will be understood to those skilled in the art.

One or more I/O devices 118 are coupled to the system bus 108. For example, the I/O device 118 includes an image scanner and document feeder for capturing an image of a document. The I/O device 118 also includes a printer for generating documents. The I/O device 118 may also include audio input/output device equipped to receive audio input via a microphone and transmit audio output via speakers.

In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that MFP 100 may include more or less components than those shown in FIG. 1 without departing from the spirit and scope of the present invention. For example, MFP 100 may include additional memory, such as, for example, a first or second level cache, or one or more application specific integrated circuits (ASICs). Similarly, additional components input/output devices 118 may be coupled to control unit 150 including, for example, an RFID tag reader, digital still or video cameras, or other devices that may or may not be equipped to capture and/or download electronic data to control unit 150. One or more components could also be eliminated such as cursor control 114.

Figure 2:
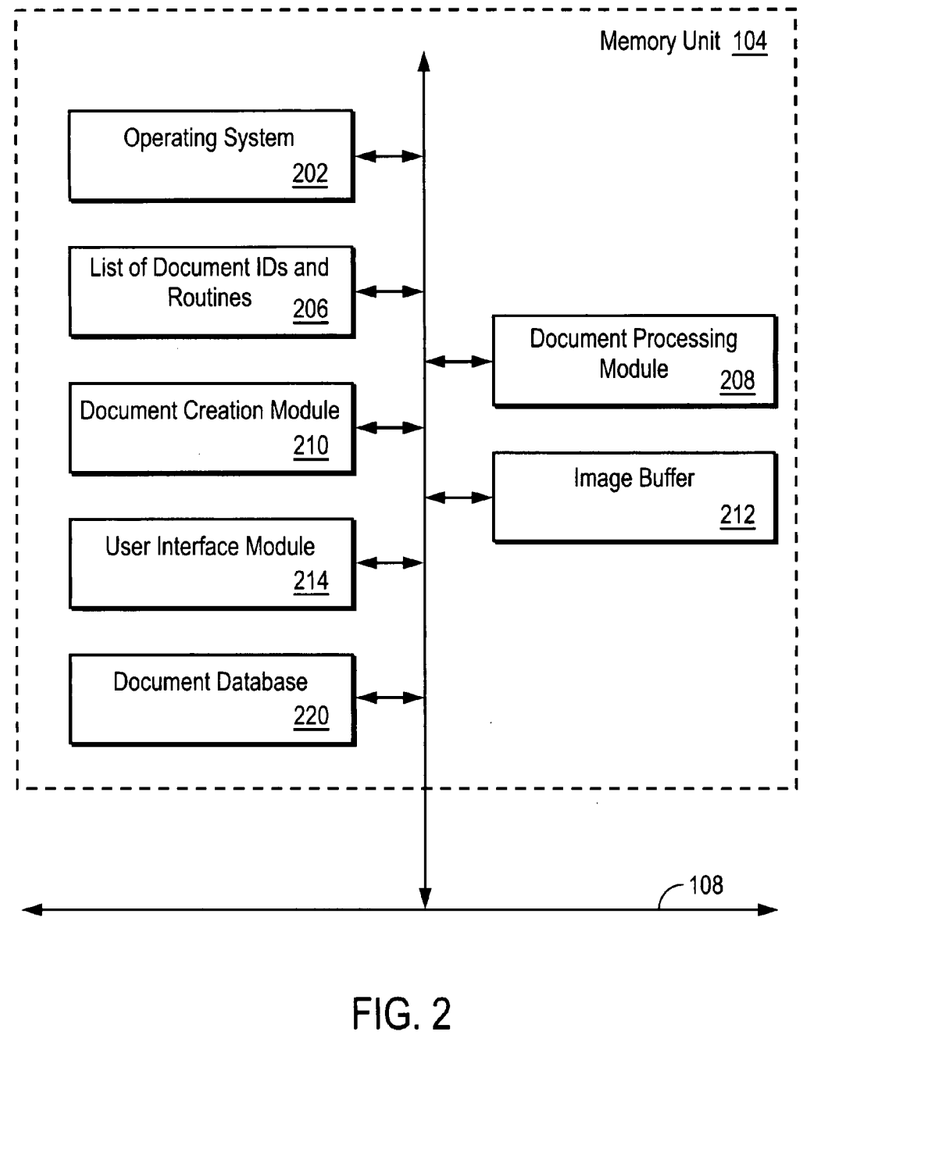
FIG. 2 illustrates one embodiment of a memory for a multi-function printer.

FIG. 2 is a block diagram of one embodiment of the memory 104 for MFP 100. The memory 104 for MFP 100 includes an operating system 202, a list of document identification data (e.g., key, numbers, etc) and routines 206, a document processing module 208, a document creation module 210, an image buffer 212, a user interface module 214, and a document database 220. As noted above, memory unit 104 stores instructions and/or data that may be executed by processor 102

The instructions and/or data may include code for performing any and/or all of the techniques described herein. These modules 202-220 are coupled by bus 108 to the processor 102 for communication and cooperation to provide the evolutionary document system 200. Those skilled in the art will recognized that while the present invention will now be described as modules or portions of a memory unit 104 of a computer system, the modules or portions may also be stored in other media such as permanent data storage device 106 and may be distributed across a network 208 having multiple different computers such as in a client/server environment.

The operating system 202 is preferably one of a conventional type such as, WINDOWS®, SOLARIS® or LINUX® based operating systems. Although not shown, memory unit 104 may also include one or more application programs including, without limitation, word processing applications, electronic mail applications, financial applications, and web browser applications.

The list of document identification data (e.g., keys) and routines 206 is preferably a table storing document identification data that correspond to the documents, and one or more corresponding tasks or routines. The document processing module 208 is a set of defined routines for performing the processing associated with each document as prescribed in the list of document identification data and routines 206. These routines are able to use the information from the list of document identification data and routines 206 and work with processor 102 to perform any number of actions such as managing a workflow, creating forms, redacting forms, storing image data in the database, updating the status of a document, removing data from the database, etc.

The document creation module 210 is a module and routines for creating a document. The document creation module 210 allows the user to create a document, define the document format, specify what action will be taken upon the document, and prescribe what feedback will be provided on the display 110 of MFP 100 back to the user. In one embodiment, the documents used are those disclosed in U.S. 20060184522, entitled "Systems and methods for generating and processing evolutionary documents," filed Sep. 8, 2005.

The image buffer 212 is used for temporary storage of a scanned image during manipulation by the document processing module 208 in performing the task(s) specified by the list of document identification numbers and routines 206. The image buffer 212 can also be used to store documents created by the document processing module 208 before they are sent to the output device 118 for printing.

The user interface module 214 communicates with and is responsive to the document processing module 208. The user interface module 214 generates information and commands that cause a message to be displayed to the user via the display device 110. Several actions can be performed on an input document after it is scanned. Many depend on or require instructions or cooperation of a human operator. The user interface module 214 includes routines to cause prompts to be displayed on the display device 410 of the MFP 100. These prompts instruct the user to keep the document, file it in a particular location, or destroy it. These instructions can require confirmation such as, for example, by pressing a button of the keypad 112.

The document database 220 is used to store documents that have been processed and scanned. The document database 220 can also maintain one or more data structures to track an evolutionary document through its lifecycle from creation to destruction. The document database 220 can also be used to temporarily store documents before migration to other databases outside of MFP 100.

Speculative Printing

In one embodiment, MFP 100 includes a mechanism to speculatively print documents for upcoming print requests based on a prior knowledge of a workflow that involves the documents. In such an embodiment, each document is mapped to, or includes, a unique identifier (ID), where the unique ID maps to a document type, a sub type and a unique instance number. In one embodiment, the unique ID is stored in a metadata portion of a document.

Figures 7A, 7B:
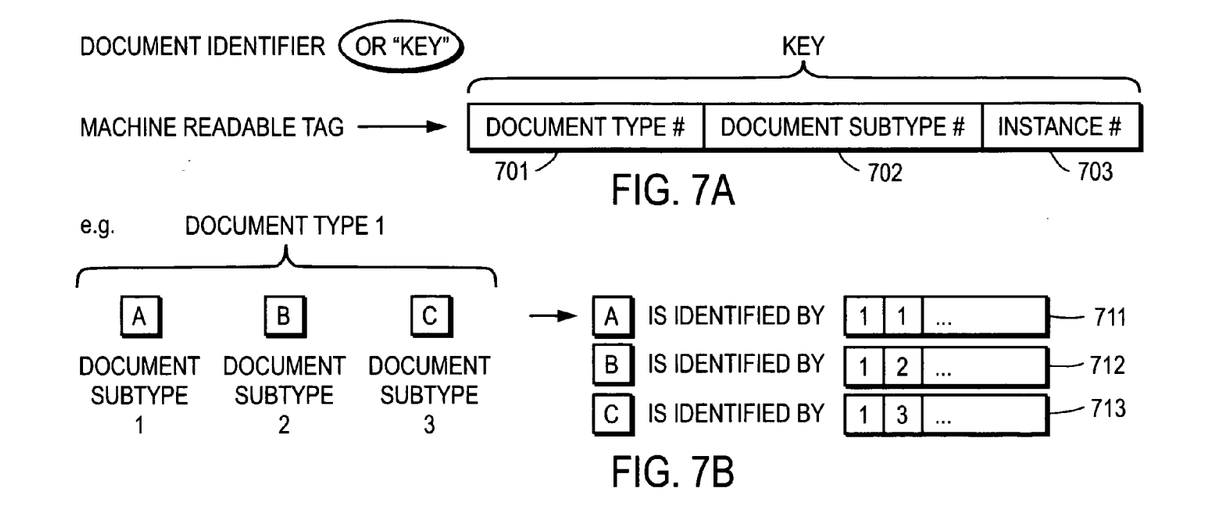
FIG. 7A illustrates one embodiment of a document identifier.
FIG. 7B illustrates different keys that all have the same document type number, yet all have different subtype numbers.

FIG. 7A illustrates one embodiment of a document identifier referred to herein as a key. Referring to FIG. 7A, the key is a machine readable tag that may be used as a document identifier that contains a document type number 701, document subtype number 702 and an instance number 703. In one embodiment, if the key is present in a document, then the document is part of a workflow. Therefore, if it is not, the document is not part of a workflow and will not be cached as described below. In one embodiment, the instance number may be used to identify the user who acted upon a document.

Figure 7C:
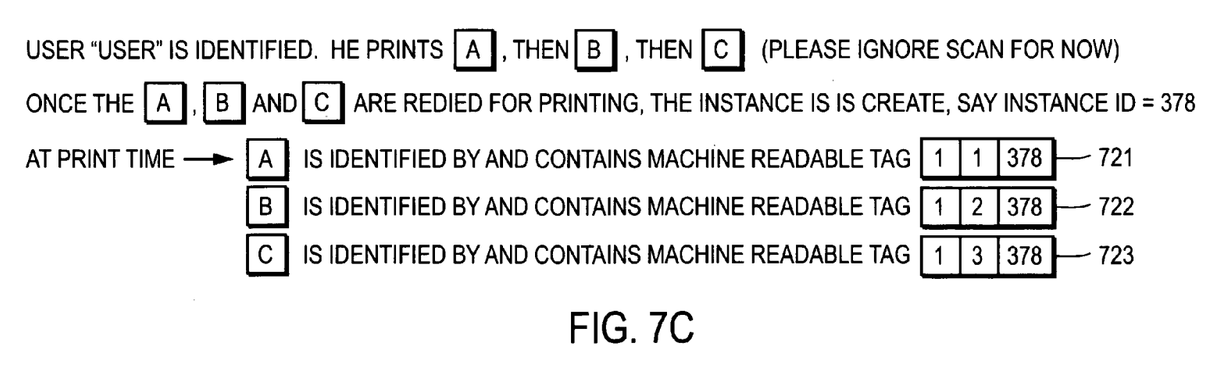
FIG. 7C illustrates documents identified at print time containing machine readable tags.

FIG. 7B illustrates different keys that all have the same document type number (1 in this example), yet all have different subtype numbers (1, 2, 3 in this example). In such a case, the instance number, which is not shown is assigned during a workflow operation such as, for example, printing. Referring to FIG. 7B, document A is identified by key 711, document B is identified by key 712 and document C is identified by key 713. If the user wishes to print document A, then document B and then document C, after documents A, B and C are ready for printing, the instance ID is created. If the instance ID is equal to 378, at print time, documents A, B and C are identified by and contained the machine readable tags 721, 722 and 723, respectively, of FIG. 7C.

The unique identifier enables MFP 100 to retrieve workflow description information from a source external to the document. However, in other embodiments, the document may itself include workflow description information. Further, workflow description information may be translated into image processing instructions.

In one embodiment, a document exists in digital form as a collection of pages including various types of content. Further, there exists a workflow that encompasses more than one distinct document, where each document in digital format (or in hardcopy) includes, or is linked to, complete information about the workflow to which the document belongs.

In one embodiment, specific content on specific pages of a document may be updated as a document goes through the workflow. In yet a further embodiment, MFP 100 includes a software application capable of creating, editing and manipulating the documents. In addition, a workflow engine is coupled to MFP 100.

Figure 3:
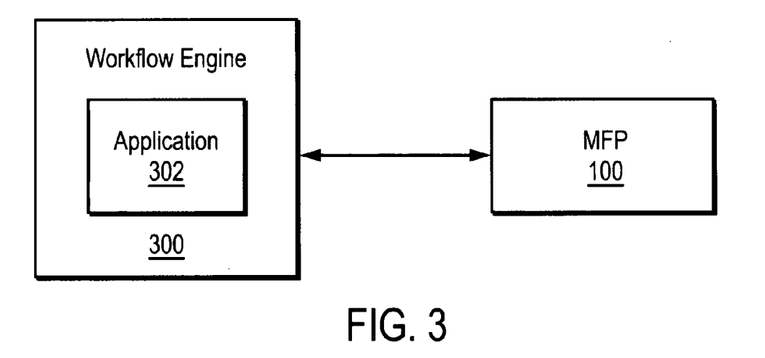
FIG. 3 illustrates one embodiment of a multi-function printer coupled to a workflow engine.

FIG. 3 illustrates one embodiment of a workflow engine 300 communicatively coupled to MFP 100. Workflow engine 300 includes an application 302 that reads the workflow information from a digital version of the documents, and renders the pertinent information for a user to perform a subsequent action. Such informations may contain what type of action should take place, what event should be triggered, etc. One skilled in the art will recognize the common widely adopted interpretation of a workflow engine and its description is outside the scope of this document.

In one embodiment, MFP 100 caches documents. In such an embodiment, the documents are cached in main memory 104. However, in other embodiments, the documents may be cached in data storage device 106. Further, MFP 100 may extract workflow information and identification data from documents when the documents are in a digital format. Finally, MFP 100 is capable of updating rendered documents in its cache with content from an outside source.

Figure 8A:
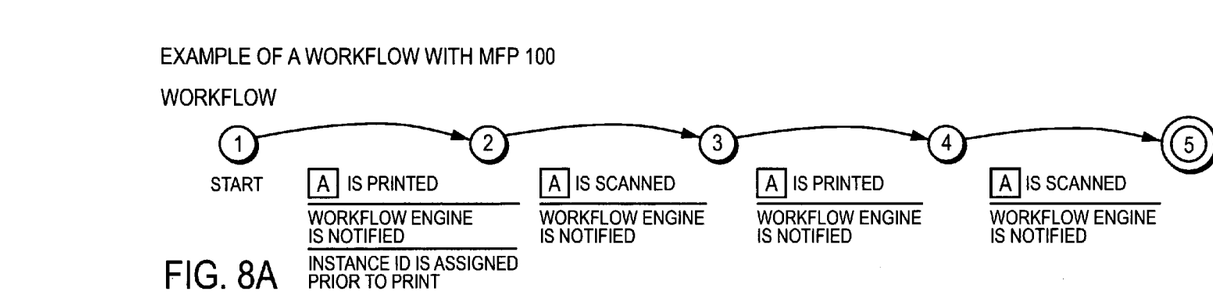
FIGS. 8A and 8B illustrate an example of a workflow with an MFP.
Figure 8B:
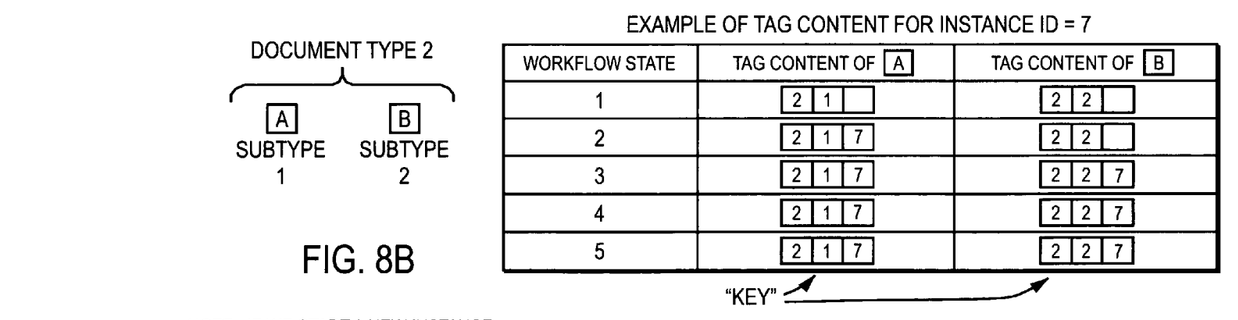

FIGS. 8A and 8B illustrate an example of a workflow with MFP 100 an example of the tag content for an instance ID. Referring to FIG. 8A, the workflow begins at state 1 and transitions to state 2 when document A is printed, the workflow engine is notified, and the instance ID is assigned prior to printing. From in state 2, the document A is scanned and the workflow engine is notified. At this point, the workflow is in state 3. Subsequently, if document B is printed and the workflow engine is notified, and the workflow transitions to state 4. Once in state 4, if document B is scanned, the workflow engine again is notified and workflow transitions to state 5 where it ends. In this workflow, documents A and B are the same type (type 2 of this example) but are different subtypes (document A as subtype 1 and document B as subtype 2). Referring to FIG. 8B, the tag content for documents A and B for each of the workflow states is shown where the instance ID is set equal to 7. As shown, at state 2, the instance number portion of the key for document A is shown as "7" in the key. That same instance number is assigned to document B at workflow state 3, even though the document subtype is different than that of document A.

Figure 8C:
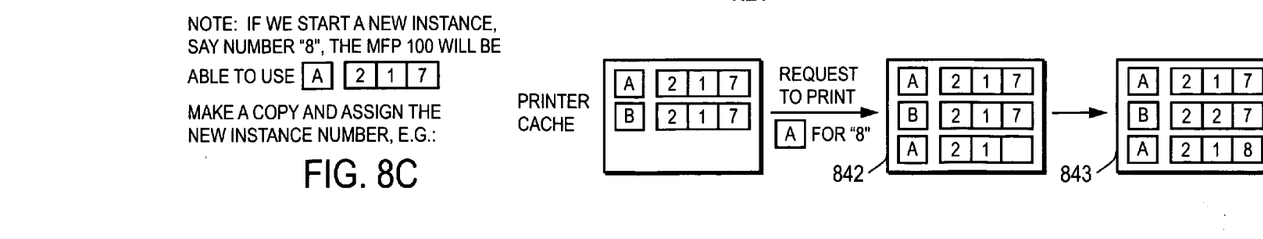
FIG. 8C illustrates a workflow starting a new instance with a document.

If a new instance is started, e.g., "8," MFP 100 is able to use the key associated with document A, namely the same key as shown in FIG. 8B for document A at workstage 2-5, and is able to make a copy and assign the new instance number. This is shown in FIG. 8C. Referring to FIG. 8C, the printer cache 841 is shown with the keys for document A and document B. After receiving the request to print document A, printer cache has added a new instance for document A (shown in printer cache 842), except no instance number has yet been assigned to the key in printer cache 842. Once instance "8" has assigned, the printer cache appears as printer cache 843 with the completed key for the second instance of document A.

Figure 4:
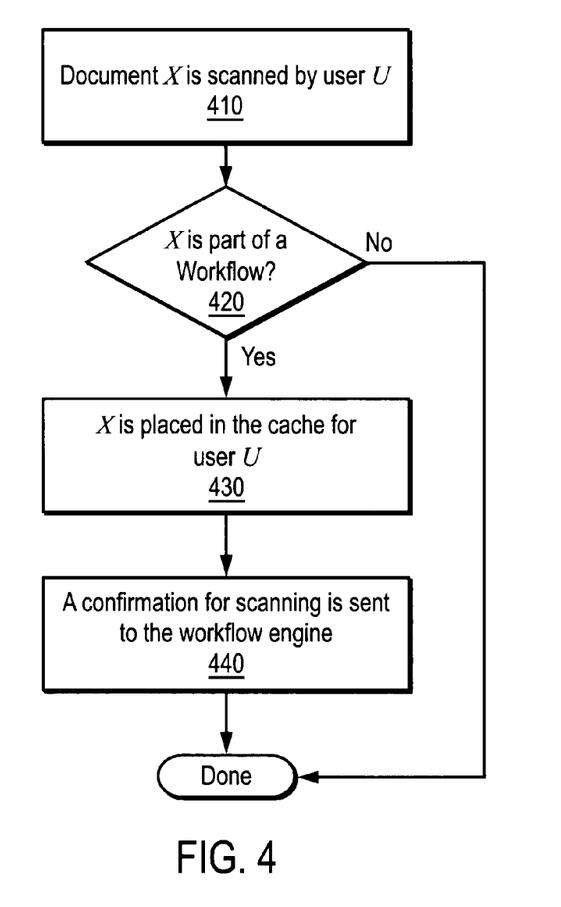
FIG. 4 is a flow diagram of one embodiment of a process for speculative printing.

FIG. 4 is a flow diagram illustrating one embodiment of entering a document into a workflow. The process is performed by processing logic that may comprise hardware (circuitry, dedicated logic, etc.), software (such as is run on a general purpose computer system or a dedicated machine), or a combination of both. In one embodiment, processing logic is included in an MFP.

Referring to FIG. 4, at processing block 410, a document is provided at (e.g., scanned or printed) MFP 100 by a user (e.g., user). At processing block 420, processing logic determines whether the document is part of a particular workflow. In one embodiment, the document includes an identifier which is read by MFP 100 to identify the document and the document processing module in MFP 102 uses the key (identifier) to determine whether the document is part of a workflow. If the document does not have a key, then processing logic determines it is not part of a workflow.

If it is determined that the document is not part of a workflow, the process is completed. However, if the document is part of a workflow, processing logic caches the document at MFP 100 (processing block 430). Subsequently, processing logic embeds an instance number (e.g., unique ID) into the document. At processing block 440, processing logic transmits a confirmation from MFP 100 to workflow engine 300.

Figure 5:
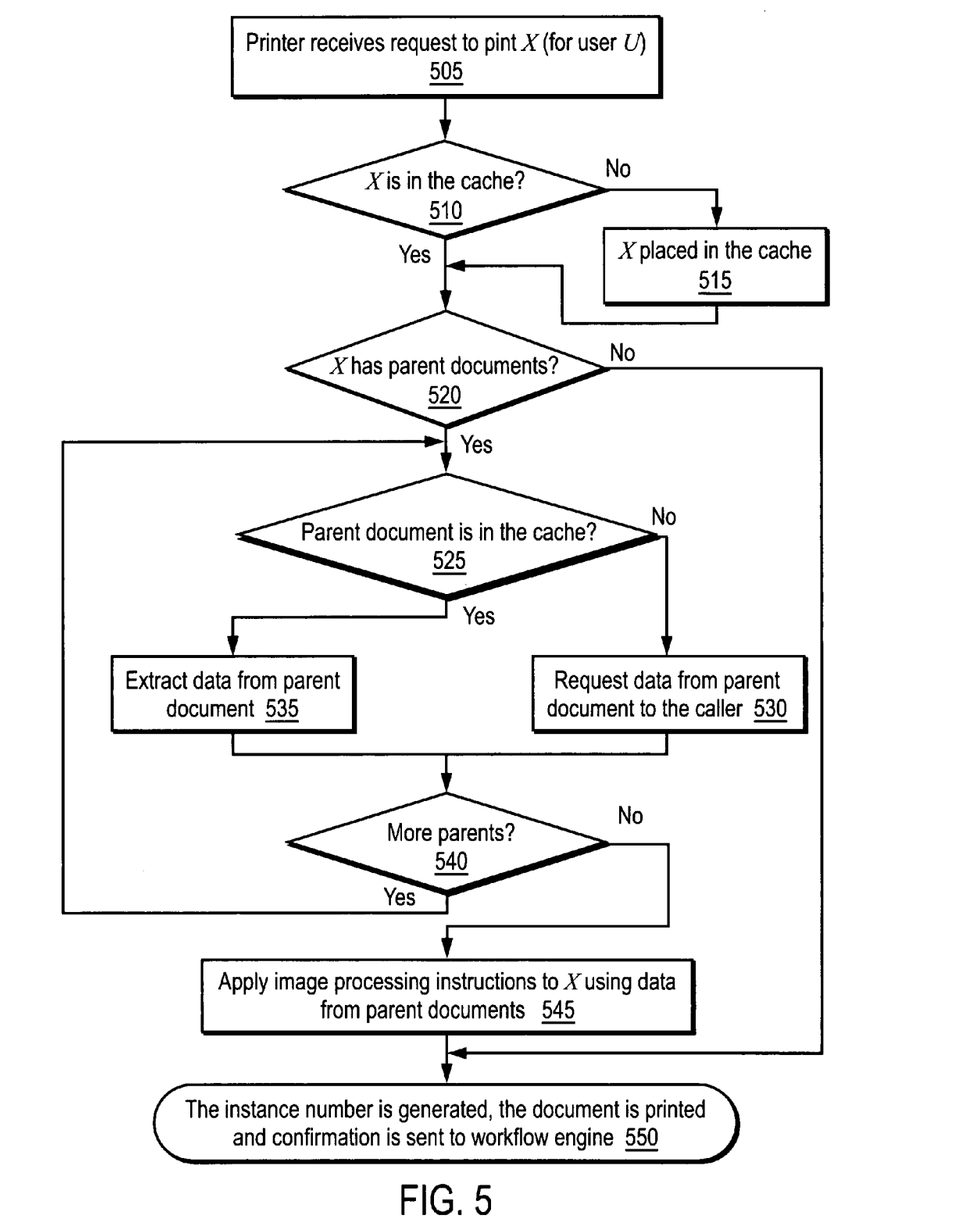
FIG. 5 is a flow diagram of another embodiment of a process for speculative printing.

FIG. 5 is a flow diagram illustrating one embodiment of speculatively printing a document. The process is performed by processing logic that may comprise hardware (circuitry, dedicated logic, etc.), software (such as is run on a general purpose computer system or a dedicated machine), or a combination of both.

Referring to FIG. 5, at processing block 505, processing logic in MFP 100 receives a request to print document X for a user (e.g., user). At processing block 510, processing logic in MFP 100 determines whether document X is stored in cache based upon the key (document identifier). If document X is not stored in cache, processing logic places it in the cache (processing block 515).

At processing block 520, processing logic determines whether document X has parent documents. If document X has no parent documents, processing logic generates an instance number, causes the document to be printed and forwards confirmation to workflow engine 300 (processing block 550).

If document X has one or more parent documents, processing logic determines whether the parent document is stored in the MFP 100 cache, (processing block 525). If the parent document is not stored in the cache, processing logic requests data from the parent document, (processing block 530). In one embodiment, the parent document is requested from an external caller, which is an application, local or remote, that requested to print. If the parent document is stored in the cache, processing logic extracts data from the parent document (processing block 535).

At processing block 540, processing logic determines whether there are more parent documents for document X. If there are additional parent documents, the process transitions back to processing block 525 where processing logic determines whether the parent document is stored in the cache. Otherwise, processing logic performs image processing instructions on document X using data from the one or more parent documents (processing block 545), and processing logic generates an instance number is generated, prints the document and forwards a confirmation to workflow engine 300 (processing block 550).

Figure 6:
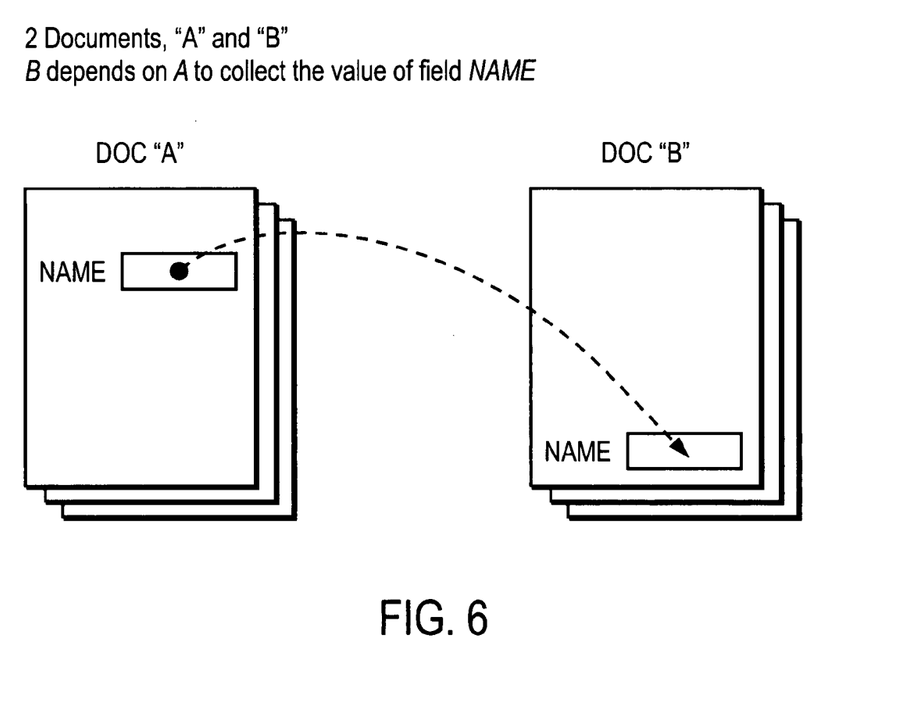
FIG. 6 illustrates a portion of a speculative printing process.

FIG. 6 illustrates of the application of one embodiment of a speculative printing process. FIG. 6 assumes a simple workflow including two distinct documents (e.g., each document includes a certain number of features that are not shared with the other). Further, document A is the first document in the workflow and document B is the following and last document. Thus, the workflow depicted in FIG. 6 shows that document B is updated with content from document A.

In one embodiment, the workflow is as follows: (1) document A is printed at MFP 100; (2) some of the content on document A is modified on paper (e.g., field name is filled); (3) document B is scanned; (4) document B is updated by cropping and pasting the area dedicated to the name content; and (5) document B is printed. In other embodiment, the above operations could be replaced by any number of different operations including any number of different actions on paper or in the digital realm.

In a further embodiment, both a user 1 and a user 2 may need to run the above workflow. Table 1 below is one embodiment of a list of events that would occur according to one embodiment and according to the temporal order of the actions in such an embodiment.

In other embodiments, the workflow procedure can be extended to a distributed landscape where multiple application and multiple printers are present. Such a landscape would include a mechanism for document and message broadcasting as well as a directory service for service discovery.

TABLE 1

User 1 prints a copy of A from the Workflow Engine
   The printer now has A in its cache
User 1 processes his copy of A and content is modified
User 1 scans his copy of A at the MFP
   The printer recognizes A and its workflow
   The printer checks its cache for B, and the check results in a miss
   The printer informs the Workflow Engine that A was scanned and the printer
   sends A to the Workflow Engine
User 1 goes to the Workflow Engine and requests to print B
The Workflow Engine applies content from A to B and sends B to the printer
   The printer now has B in its cache
User 2 opens the Workflow Engine and requests that a copy of A be printed
The printer check for A in its cache; the check results in a hit
   The printer prints a copy of A from its cache, modifying the instance #
User 2 picks up the copy of A from the printer, uses the copy and adds content to the
copy.
User 2 scans the copy of A from the MFP
   The printer recognizes A and its workflow
   The printer looks for B; B is in the cache; it is a hit
   The printer crops the content from A, generates and prints B from its cache
   A confirmation message is sent to the Workflow Engine
User 2 picks up B
Or Alternatively
   User 2 goes to the Workflow Engine and requests that B be printed from her copy of A.
   Since the Workflow Engine has received a confirmation message, The Workflow Engine
   informs User 2 that her document is waiting for her at the printer.

The above-described work flow uses document metadata to describe the flow of each document in a workflow, enabling apriori knowledge on when documents are to be printed. Such knowledge may then be used to take actions on documents ahead of the time when such actions are actually needed by the user. Thus, the printer, MFP or other peripheral device caches documents that can be reused in part for following print jobs. Once a request to print an instance of the same type document has been received, of the work flow engine needs to transmit only to the printing machine a small amount of data that contains only the content that actually needed for updating the instance of the document, as opposed to transmitting the data needed for a whole new document. As a result, printing time is reduced since the document need not to travel on the network at the time the print request is issued, hence reducing the time lag generated by moving data from a client device to a printing device.

An Example of a System and Distributed Deployment

For purposes herein, an SPF-enabled Document, or a document that is a digital file containing representation for data, metadata and images, where each page in the paper document is represented in the digital version as an image and possibly some data and metadata information associated with the page itself. These are evolutionary documents described above. Further, the paper version has a machine readable tag that actually contains all the data and metadata information.

In one embodiment, a system made of the following components:

a) a printed document with SPF capabilities, namely, with machine readable data and metadata. This metadata is referenced to as "Key";

b) an application A1 that generates new documents and associates a workflow to them;

c) an SPF-capable MFP with document cache capability and a printing agent;

d) a printing agent handling print request and optimizing data flow across the distributed system;

e) a networked document repository capable of searching and retrieving SPF documents In one embodiment, a SPF document comprises:

n dynamic fields, where $n>=0$; and m dynamic fields have been filled with values, where $1<=m<=n$.

An example of document lifecycle will illustrate how the system works. First, the user creates document A using and application (APP). Document A contains dynamic fields that will need to be filled with values before the document can be printed. Document A happens to be part of a workflow, where document B is generated after document A and it incorporates data that is collected by document A plus additional dynamic fields. The user defines document B (using application APP) and defines a mapping between some of the fields in A and B. Namely, some of the fields from A need to be copied to B. Both A and B now contains information about the workflow that uses them. Both documents are stored in the document storage. At a different time, a user accesses APP and provides values for the dynamic fields of A. He/she prints document A. This instance of A is referred to as "A1". A1 contains instance specific data and a machine readable tag containing all the information about A's fields and its workflow, including that B should be generated from A.

More information may be added to A1 via handwriting, for example. A1 is now scanned at MFPn as part of its lifecycle. After the scan, A1 is sent to the document storage, while a copy is kept in MFPn's cache.

After the scan, the MFP invokes the Printing Agent PAn that reads the metadata information (or Key). The Key tells PAn that document B should be pre-fetched for printing. Pre-fetching of B is started synchronously. Note that PAn first checks if B is present in the local cache. Once B is available to PAn, it performs the transformation on it described by the Key (i.e.: it copies the field containing "1" in the picture from A1 to B) and it creates document B1. B1 is now placed in the cache as new document. Further, B1 is sent to the Document Storage. After the upload completes, MFPn broadcast a pre-fetch message to all printing devices in the network.

MFP1 receives the pre-fetch message, downloads B1 from Document Storage, and places it in the local cache.

For the next step, the printing of the next document in the workflow, there may be two cases:

1. (First case, B1 made it to MFP1 already) A user opens APP and issues a request to print B1 on MFP1. The Print Agent PAapp creates the Key for B1 and queries MFP1 for it. PA1 receives the print request and check the cache for B1. B1 is present in the cache. PA1 applies the values from the print request to the dynamic fields of B1 and prints it. MFP1 replies that the B1 is being printed. The user walks to MFP1 and picks up his/her hardcopy of B1.
2. (Second case, B1 is not in the selected MFP yet) A user opens APP and issues a request to print B1 on MFP1. The Print Agent PAapp creates the Key for B1 and queries MFP1 for it. PA1 receives the request, check its cache. If B1 is still not present, it starts a download from the Document Repository. Once B1 is available in the cache, PA1 applies the values contained in the print request to B1 and prints it.

Case (2) exhibits the same performance as the status quo where no pre-fetching happens.

An Example of a Document "Key"

In one embodiment, each document contains a unique identifier (Key). The Key is stored inside the metadata portion of the document, but it can be generated and utilized independently of the document itself. In one embodiment. In one embodiment, the key has the following properties:
 i) unique across servers;
 ii) embeds a representation of the workflow; and
 iii) contains the version identifier of the document that uniquely identify at which state in the workflow this version occurs.

In one embodiment of the key:
1) each instance of the server application (e.g., software application) has a unique license number that can be used to uniquely identify an installation;
2) an SPF implementation has been defined and there exist a subsection in the metadata that represents the workflow. Such representation can be extracted and mapped to XML; and
3) based upon (2), it is possible to map each state in the workflow to an integer. Such integer will be referred to herein as the "document version"

```
<KEY>
<APPLICATION_SERVER_ID>
...
</APPLICATION_SERVER_ID>
<WORKFLOW>
...
</WORKFLOW>
<DOCUMENT_VERSION>
...
</DOCUMENT_VERSION>
</KEY>
```

An Example Print Request Message Format

The print request message format allows an SPF Application Server (not shown) to talk to a printer device. In one embodiment, the following is the message format:

```
<?xml version="1.0"?>
<!DOCTYPE SPF KEY>
<KEY>
...
</KEY>
<DATA>
...
</DATA>
<RENDER VALUE= ...>
<PRINT VALUE=...>
```

| Tag name | Meaning | Details |
|---|---|---|
| KEY | The document Key | See definition of KEY above |
| RENDER | Tells the device whether to render this document for printing | Boolean value, must be specified. If true, it means that no further transformations are needed for this document and it can be made ready for immediate print. |
| PRINT | Tells the device whether to print this document immediately or just pre-fetch. | Boolean. The default should be true. False is used to trigger pre-fetching and it is used by Print Agent to broadcast to all devices. |

Application

In one embodiment, the application is a client specific implementation or a customized version of a basic SPF document managing application. This application uses specific API (see Printing Agent) to handle printing. The application provides at least the following features:

Document creation including instrumentation (assigning fields)

Document workflow creation including mapping specific documents to specific states; the workflow representation should provide:
 i. Actions to be taken upon entering a state;
 ii. Actions to be taken upon exiting a state; and
 iii. A set of predefined actions (write data into fields, upload, download, print and pre-fetch for printing);

Document scanning;
Document upload to Document Storage;
Document download from Document Storage;
Document search (connecting to Document Storage); and
Document print A SPF-Capable MFP This device is an MFP augmented with an instance of printing agent software running inside and a document cache accessible by the printing agent. Further, in one embodiment, the printing agent is allowed network access and cache access. The cache is managed with LRU policy.

A Printing Agent

The printing agent is a software component implementing the functionality described above.

A printing agent handles messages to and from other instances of printing agents. In one embodiment, the functionality it provides is as follows:

Upon scan, it attempts to read SPF related data. If such data is found, it packages data and digitized images into an SPF document and it uploads it to the document storage. Then the printing agent looks up the next step in the workflow and performs any transformation that is applicable at the time. The result is packaged into a new SPF to represent the next version of the document according to the workflow and uploads it to the Document Storage. Both versions are kept in the cache. Lastly, it broadcast a pre-fetch message for the latest version of the document to all compatible devices. An order to pre-fetch is obtained by broadcasting to all agents (except the source) with a Key for the document to be download and with the flag PRINT set to false; and Handles request to print a document given a key: if the document is not in the local cache, it performs a download from the document repository.

A Networked Document Repository

A database application capable of storing documents (SPF-enabled documents) and retrieving them based on the content of their metadata. In one embodiment, this application is capable of introspecting each document and read the Key as defined above.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
receiving a request regarding a first document, wherein the first document is a digital file;
determining whether the first document is included in a workflow based on a workflow identifier associated with the first document, wherein the workflow identifier is included within the first document and comprises a machine readable tag having a document type and a document subtype; and
if the first document is associated with a workflow,
retrieving a second document from a cache, the second document having a pre-existing relationship with the first document, wherein the pre-existing relationship is based on the workflow involving the first document and the second document, wherein the first document and the second document are distinct documents,
automatically extracting data from the first document,
applying image processing to the second document using the extracted data from the first document image data to create a third document, and
printing the third document.

2. The method of claim 1 wherein applying image processing comprises compositing image data from the first document with image data of the second document.

3. The method of claim 2 further comprising retrieving the second document from an external caller if the second document is not stored in the cache.

4. The method of claim 1 wherein receiving the request regarding the first document occurs in response to scanning the first document.

5. The method of claim 1 further comprising retrieving the second document data from an external caller if the second document is not stored in the cache.

6. The method of claim 1 further comprising:
generating a unique identification (ID) for the first document after applying the image processing; and
transmitting a confirmation to a workflow engine.

7. An article of manufacture having one or more non-transitory computer readable media storing instructions thereon which, when executed by a system, cause the system to perform a method comprising:
receiving a request regarding a first document, wherein the first document is a digital file;
determining whether the first document is included in a workflow based on a workflow identifier associated with the first document, wherein the workflow identifier is included within the first document and comprises a machine readable tag having a document type and a document subtype; and
if the first document is associated with a workflow,
retrieving a second document from a cache, the second document having a pre-existing relationship with the first document, wherein the pre-existing relationship is based on a workflow involving the first document and the second document, wherein the first document and the second document are distinct documents,
automatically extracting data from the first document,
applying image processing to the second document using the extracted data from the first document image data to create a third document, and
printing the third document.

8. The article of manufacture defined in claim 7 wherein applying image processing comprises compositing image data from the first document with image data of the second document.

9. The article of manufacture defined in claim 8 wherein the method further comprises retrieving the second document from an external caller if the second document is not stored in the cache.

10. The article of manufacture defined in claim 7 wherein receiving the request regarding the first document occurs in response to scanning the first document.

11. The article of manufacture defined in claim 7 wherein the method further comprises retrieving the second document data from an external caller if the second document is not stored in the cache.

12. The article of manufacture defined in claim 7 wherein the method further comprises:
generating a unique identification (ID) for the first document after applying the image processing; an
transmitting a confirmation to a workflow engine.

* * * * *